US012705898B2

(12) United States Patent
Hwang et al.

(10) Patent No.: US 12,705,898 B2
(45) Date of Patent: Aug. 11, 2026

(54) APPARATUS AND METHOD FOR DETECTING WORKER USING THERMAL IMAGING BASED ON ARTIFICIAL INTELLIGENCE

(71) Applicants: Hyundai Motor Company, Seoul (KR); Kia Corporation, Seoul (KR); UNIST (Ulsan National Institute of Science and Technology), Ulsan (KR)

(72) Inventors: Ju Heon Hwang, Ulsan (KR); Deog Hyeon Kim, Ulsan (KR); Jinwoo Park, Busan (KR); Seungryul Baek, Ulsan (KR); Junuk Cha, Ulsan (KR); Jihyeon Kim, Ulsan (KR)

(73) Assignees: Hyundai Motor Company, Seoul (KR); Kia Corporation, Seoul (KR); Ulsan National Institute of Science and Technology, Ulsan (KR)

( * ) Notice: Subject to any disclaimer, the term of this patent is extended or adjusted under 35 U.S.C. 154(b) by 274 days.

(21) Appl. No.: 18/498,862

(22) Filed: Oct. 31, 2023

(65) Prior Publication Data

US 2025/0046086 A1 Feb. 6, 2025

(30) Foreign Application Priority Data

Aug. 1, 2023 (KR) ........................ 10-2023-0100243

(51) Int. Cl.
*G06V 20/52* (2022.01)
*G05B 19/406* (2006.01)
(Continued)

(52) U.S. Cl.
CPC ........... *G06V 20/52* (2022.01); *G05B 19/406* (2013.01); *G06T 7/10* (2017.01); *G06V 10/7715* (2022.01);
(Continued)

(58) Field of Classification Search
CPC ...... G06V 20/52; G06V 10/7715; G06T 7/10; G06T 2207/10024; G06T 2207/10048;
(Continued)

(56) References Cited

U.S. PATENT DOCUMENTS

2020/0126386 A1* 4/2020 Michalopulos ......... G06T 17/00

FOREIGN PATENT DOCUMENTS

CN 211658131 U * 10/2020
CN 114581377 A * 6/2022 ............. G06N 3/044
(Continued)

OTHER PUBLICATIONS

T. Cheng et al., "Sparse Instance Activation for Real-Time Instance Segmentation," 2022 IEEE/CVF Conference on Computer Vision and Pattern Recognition (CVPR), New Orleans, LA, USA, 2022, pp. 4423-4432, doi: 10.1109/CVPR52688.2022.00439. (Year: 2022).*

*Primary Examiner* — Andrew M Moyer
*Assistant Examiner* — Mario Anthony Rodin
(74) *Attorney, Agent, or Firm* — Slater Matsil, LLP

(57) ABSTRACT

In an embodiment, an apparatus may include an image receiver configured to receive a thermal image from a thermal imaging camera, a worker detector configured to detect a worker from the received thermal image by using an artificial intelligence model, a hazard detector configured to detect a hazard based on whether the detected worker has entered a preset hazardous area in the thermal image, and a hazard controller configured to, in response to the hazard being detected, send a hazard notification and stop operation of a work machine in the hazardous area, where a position of the detected worker can be estimated in pixel units.

20 Claims, 8 Drawing Sheets

(51) Int. Cl.
*G06T 7/10* (2017.01)
*G06V 10/77* (2022.01)
*G08B 21/02* (2006.01)

(52) U.S. Cl.
CPC .... *G08B 21/02* (2013.01); *G05B 2219/31481* (2013.01); *G06T 2207/10024* (2013.01); *G06T 2207/10048* (2013.01); *G06T 2207/20016* (2013.01); *G06T 2207/20081* (2013.01); *G06T 2207/30196* (2013.01)

(58) Field of Classification Search
CPC . G06T 2207/20016; G06T 2207/20081; G06T 2207/30196; G05B 19/406; G05B 2219/31481; G08B 21/02
See application file for complete search history.

(56) References Cited

FOREIGN PATENT DOCUMENTS

| | | | | |
|---|---|---|---|---|
| KR | 101972055 B1 * | 4/2019 | ............... | G06N 3/08 |
| KR | 20190072175 A | 6/2019 | | |
| KR | 102126498 B1 | 6/2020 | | |
| KR | 102249520 B1 | 5/2021 | | |

* cited by examiner

Figure 4:
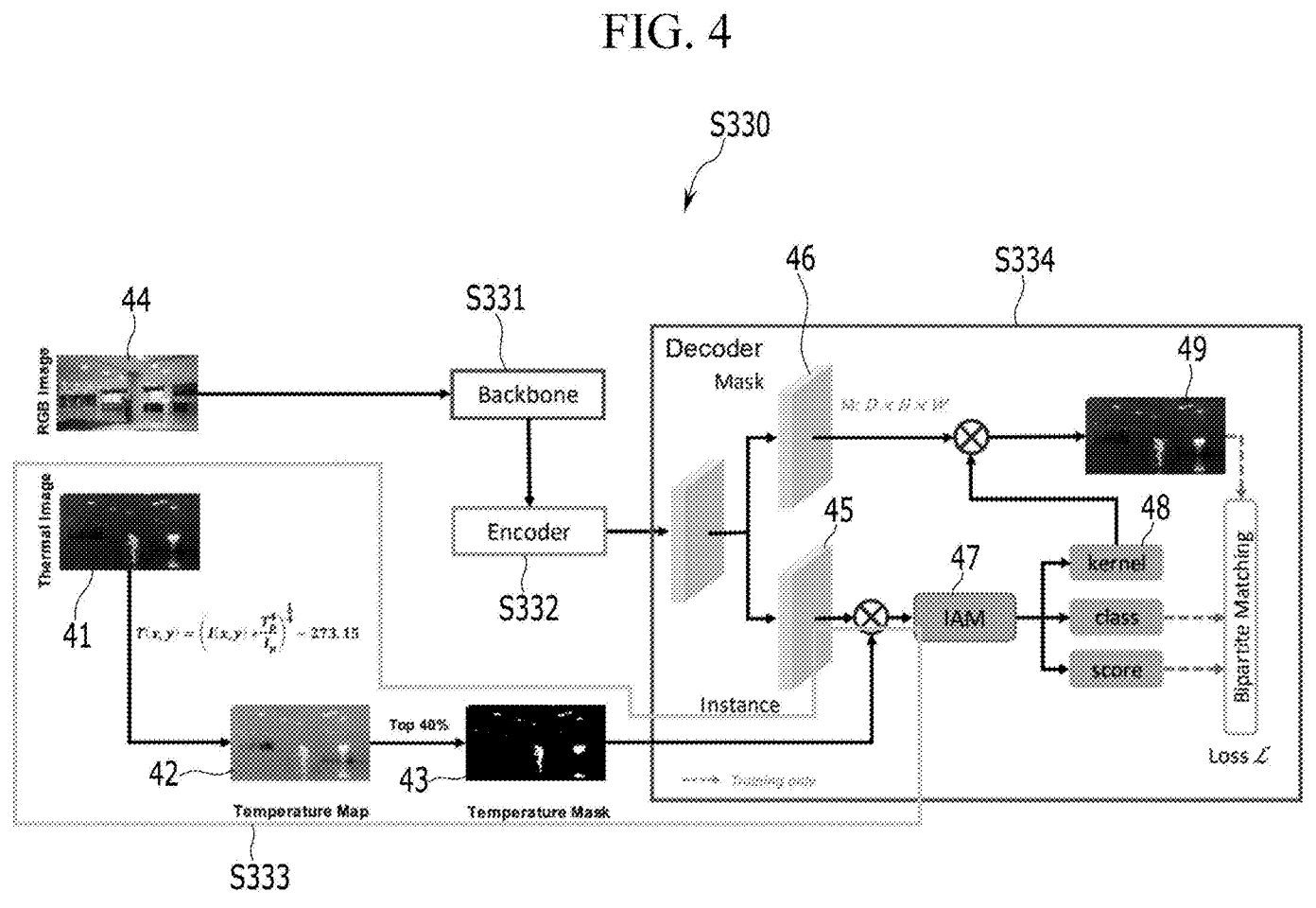

RGB Image
44
Backbone
S331
Encoder
S332
Thermal Image
41
42
Temperature Map
Top 40%
43
Temperature Mask
S333
Decoder
Mask
Instance
46
45
47
IAM
48
kernel
class
score
49
Bipartite Matching
Loss $\mathcal{L}$
S334

APPARATUS AND METHOD FOR DETECTING WORKER USING THERMAL IMAGING BASED ON ARTIFICIAL INTELLIGENCE

CROSS-REFERENCE TO RELATED APPLICATIONS

This application claims the benefit of Korean Patent Application No. 10-2023-0100243, filed on Aug. 1, 2023, which application is hereby incorporated herein by reference.

TECHNICAL FIELD

The present disclosure relates to detecting a worker using thermal imaging based on an artificial intelligence.

BACKGROUND

In factories that produce products, various machines and equipment are used for efficient production activities. However, these machines and equipment may sometimes cause accidents due to user error or equipment failure. When people work in close proximity to machines, such accidents may have serious consequences, including injury to workers. Accordingly, much research has focused on preventing accidents and ensuring employee safety, especially through human body detection technology. Human body detection technology is developed by integrating several technologies such as computer vision, deep learning, artificial intelligence, and robotics.

Computer vision is a technology that extracts useful information from image or video data, and it mimics the human visual system and allows computers to detect and identify people in videos or images.

Deep learning automatically learns features from data through a high level of abstraction, and identifies and traces people based on this. Deep learning models such as convolutional neural networks (CNNs), recurrent neural networks (RNNs), and recently transformers are used to recognize and predict human behavior.

Recently, safety problems arising from collisions between the action radius of machines and the action radius of people in factories are continuously increasing. Therefore, rapid and accurate hazard detection and machine stopping technology are needed to minimize accidents caused by hazardous factors and ensure safe working of workers.

The above information disclosed in this Background section is only for enhancement of understanding of the background of the disclosure, and therefore it may contain information that does not form the prior art that is already publicly known.

SUMMARY

The present disclosure relates to an apparatus and method for detecting a worker using thermal imaging based on an artificial intelligence. More particularly, the present disclosure relates to an apparatus and method for detecting a worker using thermal imaging based on an artificial intelligence capable of preventing accidents by detecting a worker approaching to a hazardous area.

The present disclosure attempts to provide an apparatus and method for detecting a worker using thermal imaging based on an artificial intelligence having enhanced capability of detecting existence of a worker in the proximity of high-temperature objects or obscured by objects in the factory, by utilizing deep learning-based artificial intelligence model for detecting a worker based on thermal imaging video.

An apparatus embodiment for detecting a worker using thermal imaging may include an image receiver configured to receive a thermal image from a thermal imaging camera, a worker detector configured to detect the worker from the received thermal image by using an artificial intelligence model, a hazard detector configured to detect hazard based on whether the detected worker has entered a predetermined hazardous area in the thermal image, and a hazard controller configured to, when the hazard is detected, send a hazard notification and stop operation of a work machine in the hazardous area, where a position of the detected worker is estimated in pixel units.

The image receiver may be configured to receive a color image corresponding to the thermal image.

The worker detector may be configured to extract multi-scale features from the color image by using a backbone, extract enhanced single-level features based on the multi-scale features through an encoder, and generate a mask feature in a mask branch, and generate an instance feature in an instance branch based on the input feature through the decoder by using the enhanced single-level feature as an input feature.

The worker detector may be configured to generate a temperature map from the thermal image through an equation of $$T(x, y) = \left(\frac{I(x, y)T_p^4}{I_p}\right)^{\frac{1}{4}} - 273.15$$

where, Tp is 310.35K, Ip is an average pixel value of the worker area in the thermal image, I(x, y) is a pixel value at a pixel position (x, y) in the thermal image, and T(x, y) is a temperature value calculated at a pixel position (x, y).

The worker detector may be configured to identify an area having a temperature range of top 40% among temperature ranges in the temperature map and determine the identified area as the worker area, and generate a temperature mask by selecting the worker area.

The worker detector may be configured to generate a mask kernel by inputting a result value according to an element-wise multiplication of the temperature mask and the input feature of the instance branch to an instance activation map.

The worker detector may be configured to generate a segmentation mask configured to indicate the worker through an element-wise multiplication of the mask kernel and the mask feature.

The hazard detector may be configured to determine that a hazard detected when the worker mask indicating the worker among the segmentation mask has entered the hazardous area, and determine that the worker mask has entered the hazardous area when at least 10% of an area of the worker mask overlaps the hazardous area.

The worker detector may be configured to, when the thermal image may include a temperature value in pixel units, identify an area in the thermal image whose average temperature is 28° C. to 38° C. and generate a temperature mask.

The worker detector may be configured to generate a mask kernel by inputting a result value according to an element-wise multiplication of the temperature mask and the input feature of the instance branch to an instance activation map, and generate a segmentation mask configured to indicate the worker through an element-wise multiplication of the mask kernel and the mask feature.

An apparatus embodiment for detecting a worker using thermal imaging may further include setting the hazardous area in the thermal image through a deep learning-based hazardous area recommendation model.

A method embodiment for detecting a worker using thermal imaging may include receiving a thermal image from a thermal imaging camera, by a worker detection apparatus, detecting the worker from the received thermal image by using an artificial intelligence model, by the worker detection apparatus, detecting hazard based on whether the worker has entered a predetermined hazardous area in the thermal image, by the worker detection apparatus, and sending a hazard notification and stopping operation of a work machine in the hazardous area, by the worker detection apparatus, when the hazard is detected, where a position of the detected worker is estimated in pixel units in the thermal image.

The worker detecting may include extracting multi-scale features from a color image correspond to the thermal image by using a backbone, and extracting enhanced single-level features based on the multi-scale features through an encoder.

The worker detecting may further include generating a mask feature and an instance feature through the decoder by using the enhanced single-level feature as an input feature, where the mask feature is generated in a mask branch of the decoder, and the instance feature is generated in an instance branch of the decoder based on the input feature.

The worker detecting may be configured to identify an area whose average temperature is 28° C. to 38° C. and determine the identified area as a worker area, when the thermal image may include a temperature in pixel units, generate, when the thermal image does not include the temperature in pixel units, a temperature map through an equation of $$T(x, y) = \left(\frac{I(x, y)T_p^4}{I_p}\right)^{\frac{1}{4}} - 273.15,$$

and identify an area having a temperature range of top 40% among temperature ranges in the temperature map and determine the identified area as the worker area, where, Tp is 310.35K, Ip is an average pixel value of the worker area in the thermal image, (x, y) is a pixel value at a pixel position (x, y) in the thermal image, and T(x, y) is a temperature value calculated at a pixel position (x, y), and where the method may further include generating a temperature mask in an area selected as the worker area, The worker detecting may further include matching a resolution of the temperature mask with a resolution of the input feature of the instance branch.

The worker detecting may further include generating the instance feature including a mask kernel by inputting a result value according to an element-wise multiplication of the temperature mask and the input feature of the instance branch to an instance activation map.

The worker detecting may further include generating a segmentation mask configured to indicate the worker through an element-wise multiplication of the mask kernel and the mask feature.

A method embodiment for detecting a worker using thermal imaging may further include setting the hazardous area in the thermal image through a deep learning-based hazardous area recommendation model.

The hazard detecting may include determining that the worker mask has entered the hazardous area when at least 10% of an area occupied by the worker mask indicating the worker in the segmentation mask overlaps the hazardous area.

An apparatus and method for detecting a worker using thermal imaging based on an artificial intelligence according to an embodiment may detect workers even if they are obscured by objects.

An apparatus and method for detecting a worker using thermal imaging based on an artificial intelligence according to an embodiment may infer more accurately a hazardous situation in an image, by estimating the pixel-unit location of the worker, and determining that it is a hazardous situation if a worker exists in a hazardous area set by the system administrator.

An apparatus and method for detecting a worker using thermal imaging based on an artificial intelligence according to an embodiment may stop the operation of the machine for the safety of the worker, rather than merely detecting the hazard.

BRIEF DESCRIPTION OF THE DRAWINGS

The above and other features and other advantages of embodiments of the present disclosure can be more clearly understood from the following detailed description taken in conjunction with the accompanying drawings, in which:

FIG. 4 is a drawing showing an artificial intelligence model used in a worker detection according to an embodiment;

DETAILED DESCRIPTION OF ILLUSTRATIVE EMBODIMENTS

Figure 1:
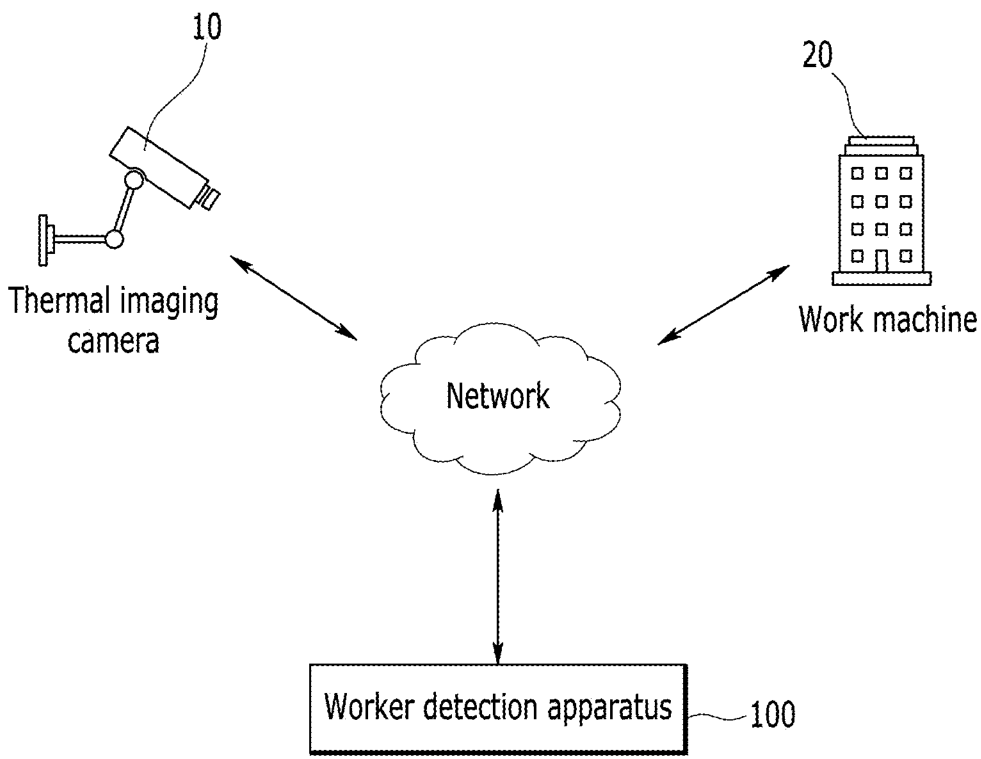
FIG. 1 is a drawing schematically showing a system for detecting a worker using thermal imaging based on artificial intelligence according to an embodiment.

Embodiments of the disclosure will be described more fully hereinafter with reference to the accompanying drawings such that a person skill in the art may easily implement an embodiment. As those skilled in the art can realize, the described embodiments may be modified in various different ways, all without departing from the spirit or scope of the present disclosure. To clarify the present disclosure, parts that are not related to the description will be omitted, and the same elements or equivalents are referred to with the same reference numerals throughout the specification.

In addition, unless explicitly described to the contrary, the word "comprise" and variations such as "comprises" or "comprising" will be understood to imply the inclusion of stated elements but not the exclusion of any other elements. Terms including an ordinary number, such as "first" and "second," can be used for describing various constituent elements, but the constituent elements are not necessarily limited by the terms. The terms can be merely used to differentiate one component from other components.

In addition, the terms "unit," "part," or "portion," "-er," and "module" in the specification can refer to a unit that processes at least one function or operation, which may be implemented by hardware, software, or a combination of hardware and software.

Hereinafter, embodiments of the present disclosure will be described with reference to the drawings.

FIG. 1 is a drawing schematically showing a system for detecting a worker using thermal imaging based on artificial intelligence according to an embodiment.

Referring to FIG. 1, a system for detecting a worker using thermal imaging based on artificial intelligence includes a thermal imaging camera 10, a work machine 20, and an apparatus 100 for detecting a worker using thermal imaging based on artificial intelligence (hereinafter, also referred to as a worker detection apparatus).

The thermal imaging camera 10 can be a device that generates images by detecting infrared radiation, that is, heat. The thermal imaging camera 10 may measure and visualize a surface temperature of an object. The thermal imaging camera 10 may generate a thermal map or thermal imaging video by detecting thermal energy emitted by an object. The thermal imaging camera 10 can be effective in protecting personal information and detecting a human being by using only thermal imaging, not color images. The thermal imaging camera 10 can be connected to the worker detection apparatus 100 through a network and may exchange thermal imaging video.

The work machine 20 may be at least one of the facilities in the factory. The work machine 20 may be a machine driven by the worker. The work machine 20 may be connected to the worker detection apparatus 100 through a network. The operation of the work machine 20 may be controlled according to instructions from the worker detection apparatus 100.

The worker detection apparatus 100 may detect the worker by using artificial intelligence from the thermal imaging video received from the thermal imaging camera 10. The artificial intelligence may be an artificial intelligence model for deep learning-based worker detection, and the artificial intelligence model may include an algorithm using convolutional neural network (CNN). The worker detection apparatus 100 may use artificial intelligence to designate a hazardous area in the image in the form of a polygon. The worker detection apparatus 100 may determine that a hazardous situation exists when the worker detection is made within the polygon that is the hazardous area. The worker detection apparatus 100 may ensure the safety of work by immediately stopping the operation of the work machine 20 in process after detecting the hazard. The worker detection apparatus 100 may estimate a position of the worker in pixel units from a thermal imaging video. Pixel units may be expressed as coordinate values for pixel positions.

Figure 2:
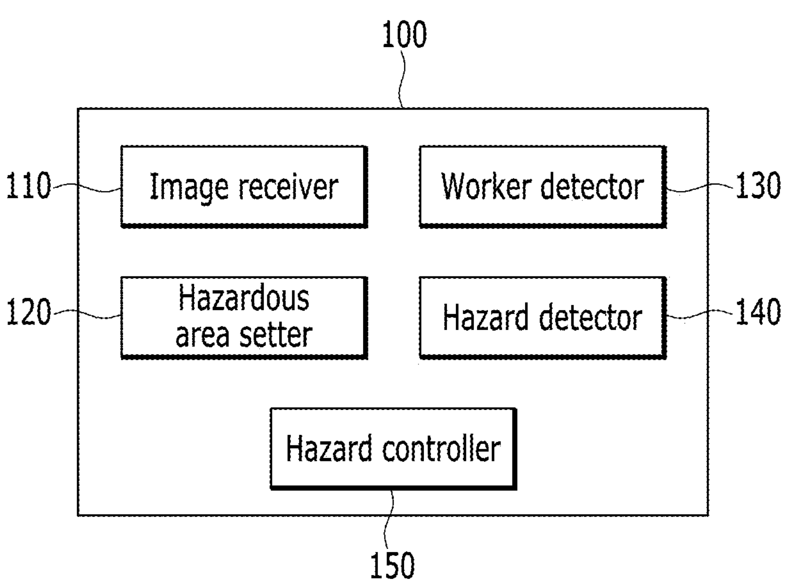
FIG. 2 is a block diagram of an apparatus for detecting a worker using thermal imaging based on artificial intelligence according to an embodiment.

FIG. 2 is a block diagram of an apparatus for detecting a worker using thermal imaging based on artificial intelligence according to an embodiment.

Referring to FIG. 2, the worker detection apparatus 100 includes an image receiver 110, a hazardous area setter 120, a worker detector 130, a hazard detector 140, and a hazard controller 150.

The image receiver 110 may receive a thermal image from the thermal imaging camera 10 (refer to FIG. 1). The image receiver 110 may receive a color image corresponding to the thermal image. The image receiver 110 may receive respective thermal images included in a plurality of frames of the thermal imaging video from the thermal imaging camera 10.

The hazardous area setter 120 may set the hazardous area through a deep learning-based hazardous area recommending artificial intelligence model. The hazardous area may include a position with a hazard of falling, a position with many machines, etc. The hazardous area recommending artificial intelligence model may receive an input of the thermal image, extract the hazardous area in the image, and display the extracted hazardous area on the image.

Through the hazardous area recommending artificial intelligence model, the hazardous area setter 120 may recommend a boundary box with respect to the hazardous area in the thermal image, and set the hazardous area by utilizing it. For example, the hazardous area setter 120 may set the boundary box indicating the hazardous area in a shape of a polygon.

In an embodiment, the hazardous area setter 120 may provide the hazardous area recommended through the hazardous area recommending artificial intelligence model to the user (or worker). The hazardous area setter 120 may determine the boundary box of the hazardous area modified or selected by the user as a final hazardous area. Alternatively, the hazardous area setter 120 may provide an interface enabling the user to directly set the hazardous area.

The worker detector 130 may detect the worker by using the artificial intelligence model from the received thermal image. The artificial intelligence model may include a deep learning-based convolutional neural network (CNN) model. The artificial intelligence model may include a deep learning-based algorithm using the convolutional neural network. The artificial intelligence model may include a deep learning algorithm for an instance segmentation. The instance segmentation can mean distinguishing objects at the pixel level in an image. For example, the artificial intelligence model may include Sparse Inst.

In an embodiment, the artificial intelligence model can be a convolution-based framework for real-time instance segmentation, proposing a sparse set of instance activation map (IAM) to highlight areas containing information about each instance.

The artificial intelligence model may obtain instance-level features by aggregating features based on the highlighted area to obtain the segmentation mask. The instance activation map (IAM) can predict the type of each object one-to-one through binary matching and prevent no-maximum suppression (NMS) during post-processing.

The artificial intelligence model may consist of a backbone network, an instance context encoder, and an IAM-based decoder. The backbone extracts a multiple-scale image feature from an input image. The encoder can generate enhanced single-level features from the multiple-scale image features. The IAM-based decoder can generate an accurate the segmentation mask.

The artificial intelligence models generally can receive and process RGB images as input. In an embodiment, the artificial intelligence model may include an algorithm that receives the thermal image as input along with the RGB image. That is, the artificial intelligence model may include a worker detection algorithm utilizing thermal imaging. A worker detection algorithm through an artificial intelligence model of the worker detector 130 is explained in detail in FIG. 4.

The hazard detector 140 may detect hazards based on whether the detected worker has entered a predetermined hazardous area in the thermal image.

The hazard detector 140 may determine that a hazard is detected, when the worker mask indicating the worker in the image has entered the hazardous area. When at least 10% of the pixel area occupied by the worker mask overlaps the hazardous area, the hazard detector 140 may determine that the worker has entered the hazardous area.

When a hazard is detected by the hazard detector 140, the hazard controller 150 may send a hazard notification, and stop operation of the work machine 20 in the hazardous area.

Figure 3:
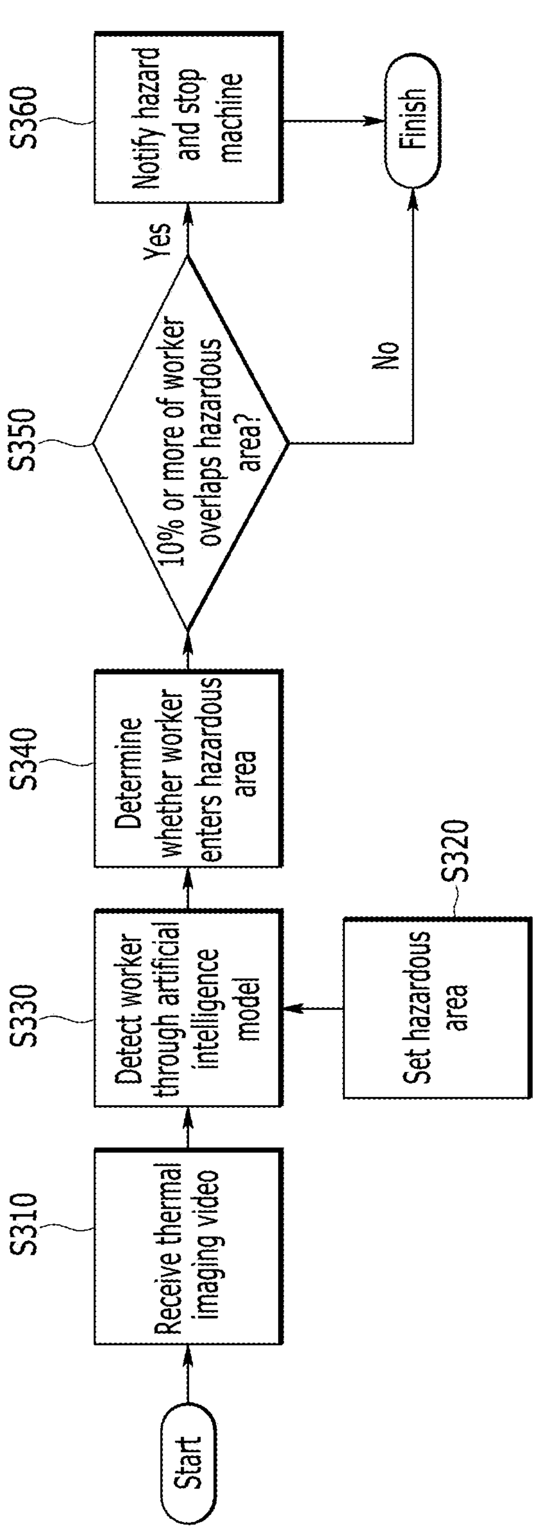
FIG. 3 is a flowchart of a method for detecting a worker using thermal imaging based on an artificial intelligence according to an embodiment.

FIG. 3 is a flowchart of a method for detecting a worker using thermal imaging based on an artificial intelligence according to an embodiment. A method for detecting a worker using thermal imaging based on an artificial intelligence may be performed by the worker detection apparatus 100 (refer to FIG. 1 and FIG. 2).

In FIG. 3, at operation S310, the worker detection apparatus 100 may receive the color image correspond to the thermal image and the thermal image from the thermal imaging camera through the image receiver 110.

At operation S320, the worker detection apparatus 100 may set the hazardous area by using the deep learning-based hazardous area recommending artificial intelligence model through the hazardous area setter 120.

At operation S330, the worker detection apparatus 100 may detect the worker by using the artificial intelligence model from the thermal image through the worker detector 130. A detailed description of operation S330 will be described later with reference to FIG. 4.

At operation S340, the worker detection apparatus 100 may determine whether a worker has entered the predetermined the hazardous area in the thermal image, through the hazard detector 140. When it is determined that a worker has entered the hazardous area, the hazard detector 140 determines that a hazard is detected.

At operation S350, the hazard detector 140 may determine whether 10% or more of the worker overlaps the hazardous area. For example, when at least 10% of the pixel area occupied by the worker mask detected through the worker detector 130 overlaps the pixel area occupied by the hazardous area, the hazard detector 140 may determine that the worker has entered the hazardous area and determined that the hazard is detected.

When the hazard is detected, at operation S360, the worker detection apparatus 100 may send the hazard notification to the worker through the hazard controller 150, and stop operation of the work machine 20 in the hazardous area.

FIG. 4 is a drawing showing an artificial intelligence model used in a worker detection according to an embodiment. FIG. 4 also shows a method of detecting the worker by using the artificial intelligence model. The worker detection algorithm (operation S330 of FIG. 3) through the artificial intelligence model of FIG. 4 may be performed through the worker detector 130 (refer to FIG. 2).

At operation S331, the worker detector 130 may extract multi-scale features from the color image 44 by using a backbone or a backbone network. The multi-scale features may refer to features extracted from various sizes and resolutions of the image.

The backbone network (e.g., ResNet) may act as a feature extractor. The backbone network may receive an image as input and passes it through a series of convolutional layers to transform the raw pixel information into hierarchical and abstract features. These transformed features contain various levels of information, from low-level details such as edges and textures to high-level semantic representations associated with the object.

The backbone network may be initialized with weight values pre-trained on ImageNet. Other modules can be initialized randomly. The backbone network extracts the multi-scale features (e.g., {C3, C4, C5}) corresponding to different stages of the network. Each Cx may represent a feature map output from the x-th convolution block of the network. That is, C3 may refer to the feature map output from the 3rd convolution block. The feature maps extracted from C3, C4, and C5 can have different resolutions, and through this, objects of various sizes in the image may be detected. For example, a C3 feature map may be used to detect small objects, while a C5 feature map may be used to detect large objects.

C3 may be a feature map extracted at an intermediate level of the backbone network. This feature map can contain mid-level visual information such as edges, textures, and basic shapes, and can have a lower resolution compared to the input image. C4 and C5 can represent the post-intermediate stages of the network, where the spatial resolution is lowered and the feature designation area is expanded. These feature maps can contain more global and contextual information, such as high-level semantic representations related to objects in the image. Features extracted from the backbone network are transferred to subsequent modules within the framework of the artificial intelligence model, such as the instance context encoder.

At operation S332, the worker detector 130 may extract the enhanced single-level feature based on the extracted multi-scale features through an encoder. The enhanced single-level features may be features obtained by integrating or converting the multi-scale features into single-scale features. The encoder may utilize feature information extracted from various multi-scales to generate the enhanced single-level features that are more powerful and information-rich.

For example, if the multi-scale features can refer to feature maps at multiple scales extracted from a specific network structure (e.g. C3, C4, C5 in ResNet), and then the enhanced single-level features can integrate, convert, and improve these multi-scale features, to be made into a single-scale feature containing richer information.

The framework of the artificial intelligence model may more promptly infer by utilizing the single-level prediction. To overcome the limitations of the single-level features for objects with various scales, the worker detection unit 130 can use the instance context encoder (hereinafter referred to as encoder). The encoder can expand the feature designation area by pooling information at multiple scales using a pyramid pooling module (PPM) after the C5 feature layer. The encoder may divide the feature map into multiple grids and perform max pooling within each grid. The pooled features can produce enhanced representations with richer contextual information. This pooled feature may go two ways. The first one can pass through the convolutional network and becomes a feature map P5. The second one may be up-sampled by two times and combined with C4. In addition, these combined features may also go two ways. The first one can pass through the convolutional network and become a feature map P4. The second can be up-sampled by two times and combined with C3. These combined features may pass through a convolutional network to become a feature map P3. P4 and P5 can be subjected to up-sampling by two times and four times to match the resolution of P3. These three feature maps can be then concatenated to become the enhanced single-level feature that contains both local and global context information. This feature can allow a decoder network to generate more detailed segmentation masks.

The output of the instance context encoder can be the enhanced single-level feature for segmentation, making inference very fast, and the features used in subsequent operations of the framework may contain rich information.

The worker detector 130 may generate an instance feature in an instance branch 45 of the decoder based on the enhanced single-level feature, and generate a mask feature in a mask branch 46 of the decoder.

The decoder can be responsible for generating an accurate segmentation mask 49. The decoder may be composed of the instance branch 45 and the mask branch 46. The instance branch 45 may generate an instance activation map (IAM) 47 and N the instance features for generating a kernel 48. The mask branch 46 may extract instance-related mask features M.

In the instance branch 45, the instance activation map 47 can highlight each instance using a single activation map. For example, the instance activation map 47 may generate the single activation map by applying an input features of the instance branch to a 3×3 convolutional layer and a sigmoid activation function. The instance activation map 47 may obtain the instance features, which can be 256-dimensional vectors, by element-wise multiplying the single activation map with the input features of the instance branch 45. Class, objectness score, and a mask kernel 48 may be calculated from the instance feature.

The class (or classification) may assign a probability for a class to the i-th prediction to predict a class label for each instance. The objectness score can represent the reliability or objectness measure for each predicted instance. This can appear on the actual object, not the background. The mask kernel 48 may represent instance-related mask features used for generation of the segmentation mask for each instance.

The operator detection unit 130 may mask the input features of the instance branch 45 with a temperature mask 43 and supply them to the instance branch 45 of the segmentation decoder.

When a temperature value in pixel units does not exist in a data set of the thermal image 41, the worker detector 130 may generate a temperature map 42 from the thermal image 41 through the following equation below.

$$T(x, y) = \left(\frac{I(x, y)T_p^4}{I_p}\right)^{\frac{1}{4}} - 273.15 \quad \text{[Equation]}$$

Tp may be 310.35K, and Ip may be an average pixel value of a worker area in the thermal image. I(x, y) may be a pixel value at a pixel position (x, y) in the thermal image, and T(x, y) may be a temperature value calculated at a pixel position (x, y). The worker detection unit 130 may obtain an approximate temperature value of the human area corresponding to the worker from the temperature map 42, and may obtain the temperature value range of the human area or the worker area according to the data set.

The worker detector 130 may identify an area having a temperature range of top 40% among temperature ranges in the temperature map 42 and determine the identified area as the worker area, and select the worker area, to generate the temperature mask 43. The temperature mask 43 may be referred to as worker mask 43.

In an embodiment, when the data set of the thermal image 41 includes a temperature value for each pixel of the image, the worker detector 130 may identify an area showing a temperature (e.g., 28° C. to 38° C. range) similar to that of a human being by utilizing this data, to generate the temperature mask 43.

In an embodiment, the worker detector 130 may obtain the temperature mask 43 having the resolution of the input thermal image, and then may adjust the resolution such that a resolution of the temperature mask 43 may match a resolution of the input feature of the instance branch.

At operation S334 shown in FIG. 4, the worker detector 130 may input a result value according to an element-wise multiplication of the temperature mask 43 and the input feature of the instance branch 45 to the instance activation map 47 to generate the instance feature including the mask kernel 48, and may generate the segmentation mask 49, through an element-wise multiplication of the mask kernel 48 and the mask feature M.

The worker detector 130 may generate the segmentation mask 49 for each instance through the element-wise multiplication with the instance-related mask kernel 48 generated in the instance branch 45 and the mask feature generated in the mask branch 46. The segmentation mask 49 may include segmentation information about the object included in the thermal image 41 or the color image 44. The segmentation information may refer to detailed information about the position, shape, size, etc. of an object obtained through the process of identifying and separating individual objects.

The segmentation mask may refer to a binary image that displays an object of interest in an image. The segmentation mask usually has the same size as the original image, and may be set to 1 (or another positive number) for pixels that represent an object of interest (e.g., the worker) and to 0 for pixels that do not. For example, the worker detection unit 130 may generate the segmentation mask that displays the worker in the image. At this time, the segmentation mask may be the worker mask.

The operator detection unit 130 may use the segmentation mask to determine which class each pixel in the image belongs to, and may identify or classify individual objects in the image based on this. For example, the worker detection unit 130 may determine a pixel corresponding to a worker in the thermal image and identify it using the segmentation mask. The segmentation mask can represent the exact position and boundary of the object, including the worker, and may separate the object at the pixel level. The worker detection apparatus 100 may estimate the worker in the thermal image in the pixel units through the worker detection unit 130.

Figure 5:
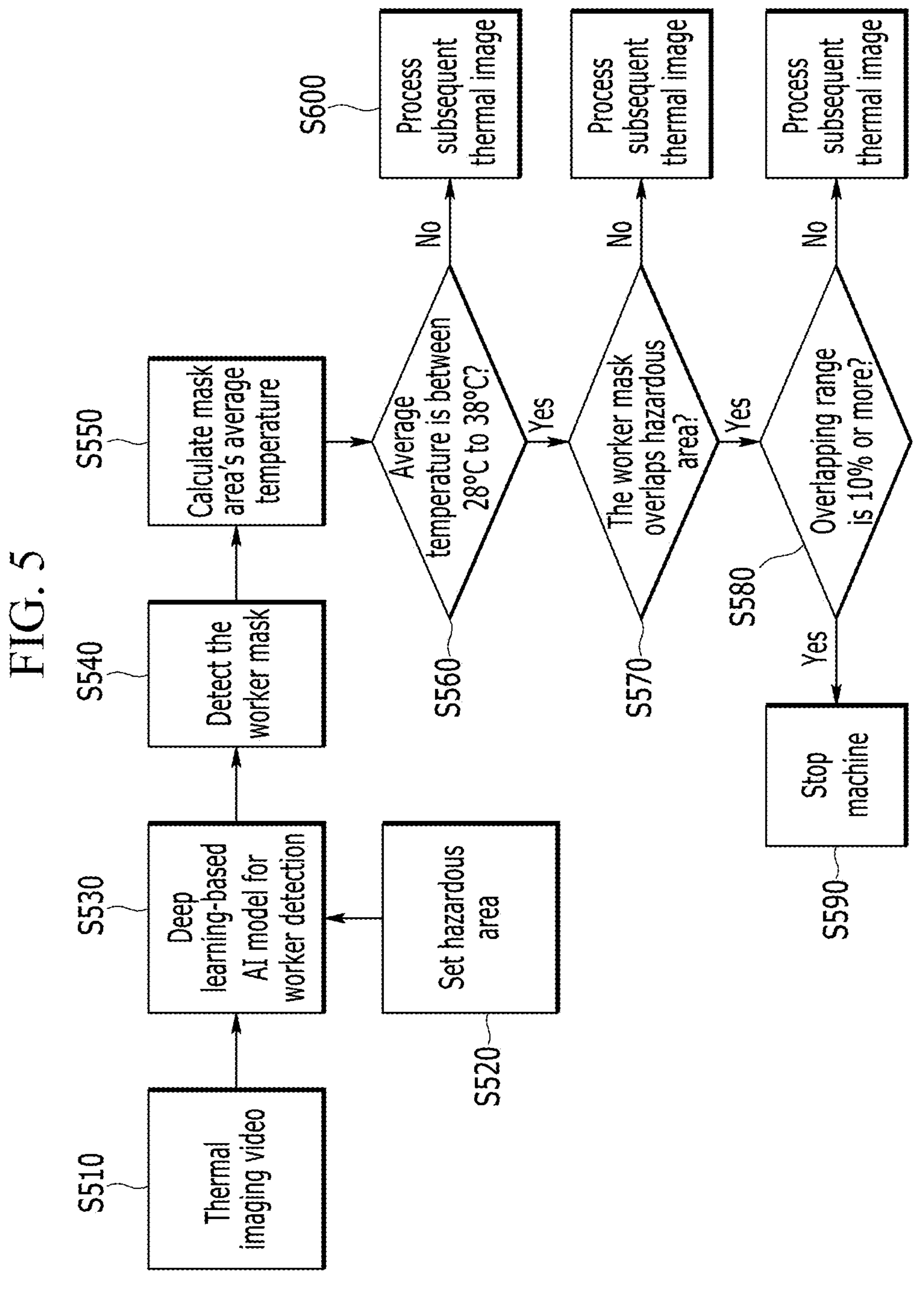
FIG. 5 is a flowchart of a method for detecting a worker using thermal imaging based on an artificial intelligence according to an embodiment.

FIG. 5 is a flowchart of a method for detecting a worker using thermal imaging based on an artificial intelligence according to an embodiment. The embodiment of FIG. 5 may correspond to a case where a temperature value is included in the thermal image.

At operation S510, the worker detection apparatus 100 may receive the thermal imaging video from the thermal imaging camera.

At operation S520, the worker detection apparatus 100 may set the hazardous area, through the artificial intelligence.

At operation S530, the worker detection apparatus 100 may detect the worker in the thermal imaging video through a deep learning-based artificial intelligence (AI) model.

At operation S540, the worker detection apparatus 100 may detect the worker mask in the thermal imaging video through the artificial intelligence model.

At operation S550, the worker detection apparatus 100 may calculate the average temperature of the area occupied by the detected worker mask. The worker detection apparatus 100 may finally determine the position of the worker in the thermal imaging video through an average temperature of the area of the worker mask.

At operation S560, the worker detection apparatus 100 may determine whether the average temperature of the area of the worker mask correspond to a range of 28° C. to 38° C. If the operation S560 is satisfied, the worker detection apparatus 100 may finally determine that the worker is positioned in the area of the worker mask. When the average temperature of the area of the worker mask does not correspond to a range of 28° C. to 38° C., the worker detection apparatus 100 may perform the following processing on the thermal imaging video. The worker can be detected from a subsequent frame image of the thermal imaging video by the same method, and work machine control due to hazard may be performed.

At operation S570, thereafter, the worker detection apparatus 100 may determine whether the worker mask and the hazardous area overlap each other. When they do not overlap, the worker detection apparatus 100 may perform the processing again on the subsequent thermal imaging video.

At operation S580, when the worker mask and the hazardous area overlap each other, the worker detection apparatus 100 may determine whether 10% or more of the area occupied by the worker mask overlaps the hazardous area. If so, at operation S590, the worker detection apparatus 100 may send the hazard notification to the worker, and may stop the work machine located in the hazardous area. Otherwise, the worker detection apparatus 100 may perform the worker detection and hazard control operations again on a subsequent frame image.

Figure 6:
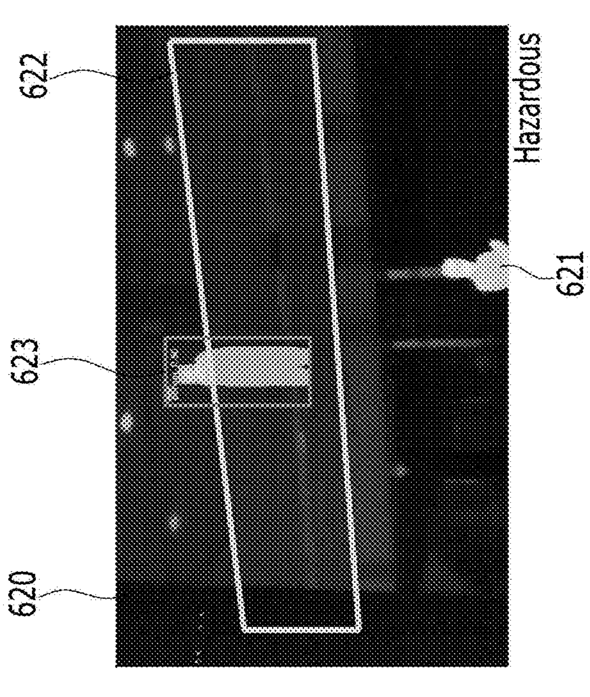
FIG. 6 and FIG. 7 show images where a worker is detected by an apparatus and method for detecting a worker using thermal imaging based on an artificial intelligence according to an embodiment.
Figure 6:
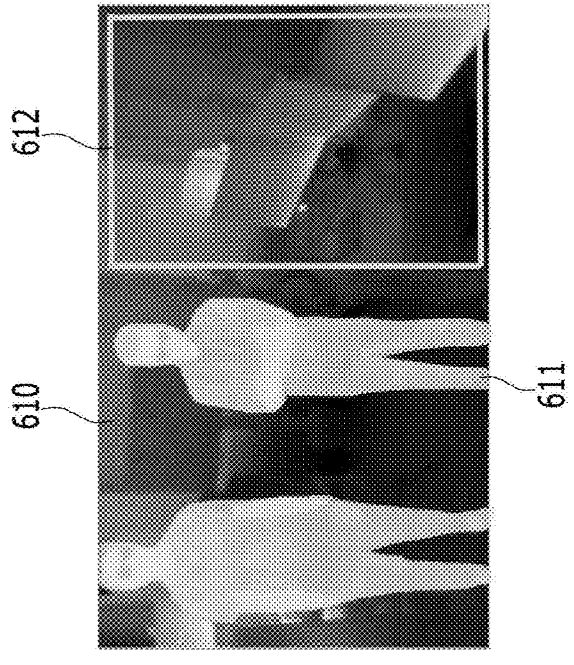
Figure 7:
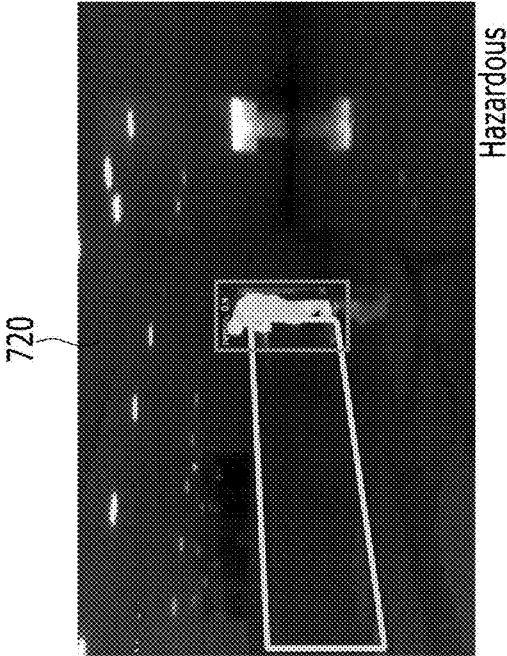
Figure 7:
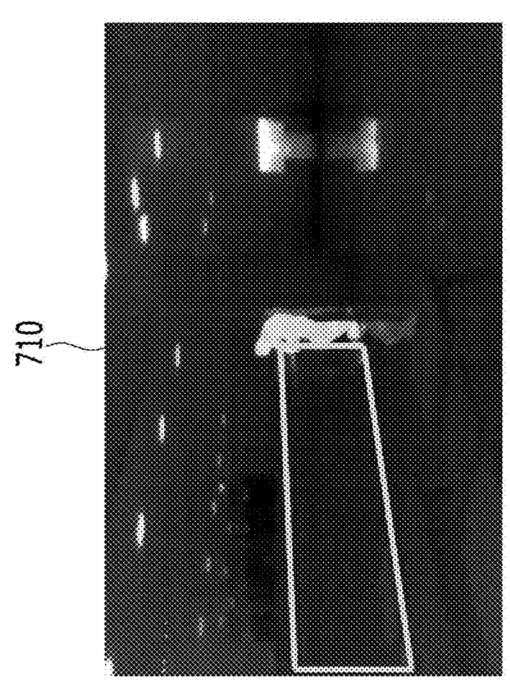

FIG. 6 and FIG. 7 show images where a worker is detected by an apparatus and method for detecting a worker using thermal imaging based on an artificial intelligence according to an embodiment.

In FIG. 6, a safe worker mask 611 can be displayed in blue in a first image 610. The hazardous area 612 can be indicated by a yellow boundary box. Because there is no hazardous worker mask in the first image 610, no hazard is detected.

Whereas, a second image 620 includes a hazardous worker mask 623. In the second image 620, a safe worker mask 621 may be displayed in blue and a hazardous worker mask 621 may be displayed in green. The safe worker mask 621 is a worker mask that does not overlap at all with the hazardous area 622, and the hazardous worker mask 623 is a worker mask that overlaps the hazardous area 622 by more than 10% of the worker mask. In the second image, the hazardous worker mask 623 overlaps the hazardous area 622 by about 80% or more, so hazard is detected. Therefore, the worker detection apparatus 100 (refer to FIG. 1) may notify the hazard to the worker (e.g., worker corresponding to worker mask 623), and may stop the work machine 20 (refer to FIG. 1) located in the hazardous area 622.

In FIG. 7, a third image 710 shows a case where less than 10% of the worker overlaps the hazardous area, and a fourth image 720 shows a case where the workers overlaps more than 10% of the hazardous area.

In the third image 710, the worker can be displayed in blue, and in the fourth image 720, the worker can be displayed in green (i.e., a different color/indicator). In the case of the third image 710, a hazard alarm may not be transmitted, and in the case of the fourth image 720, the hazard alarm may be transmitted. The hazardous area may be an area near floor-to-ceiling windows or an area having a risk of falling, for example.

Figure 8:
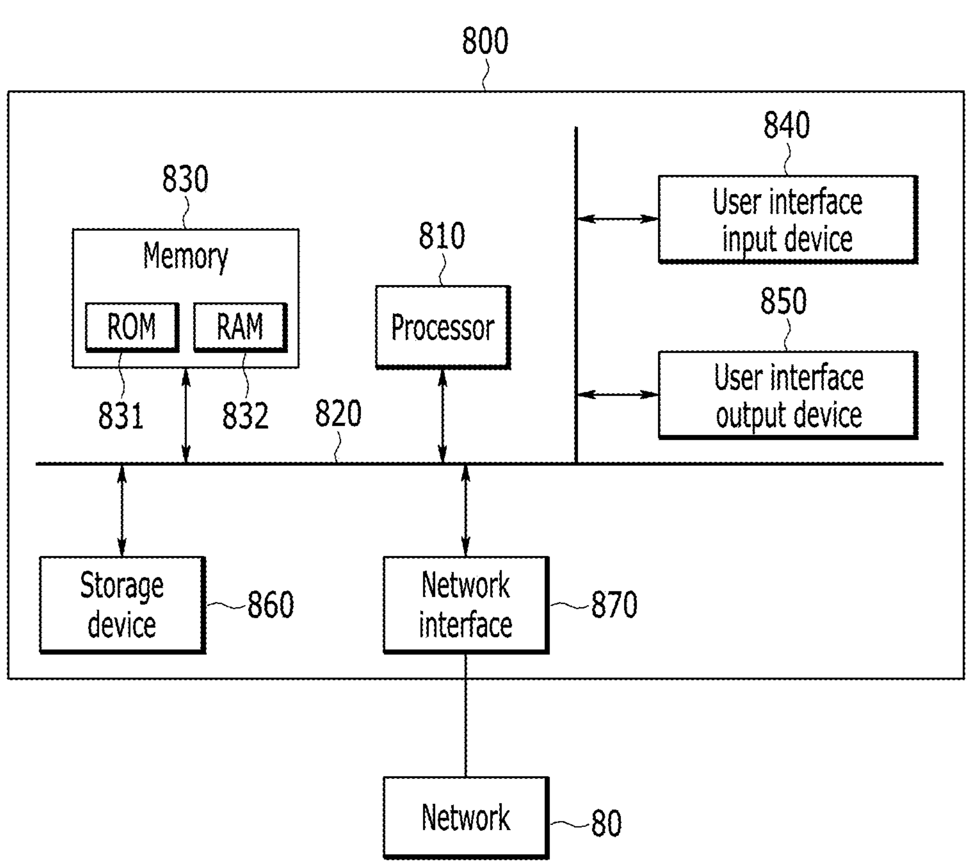
FIG. 8 is a drawing for explaining a computing device according to an embodiment.

FIG. 8 is a drawing for explaining a computing device according to an embodiment.

Referring to FIG. 8, an apparatus and method for detecting a worker using thermal imaging based on an artificial intelligence according to an embodiment may be implemented by using a computing device 800.

The computing device 800 may include at least one of a processor 810, a memory 830, a user interface input device 840, a user interface output device 850, and a storage device 860 that communicate through a bus 820. The computing device 800 may also include a network interface 870 electrically connected to a network 80. The network interface 870 may transmit or receive signals with other entities/machines through the network 80.

The processor 810 may be implemented in various types, such as a micro controller unit (MCU), an application processor (AP), a central processing unit (CPU), a graphic processing unit (GPU), a neural processing unit (NPU), and the like, and may be any type of semiconductor device capable of executing instructions stored in the memory 830 or the storage device 860. The processor 810 may be configured to implement the functions and methods described above with respect to FIG. 1 to FIG. 8.

The memory 830 and the storage device 860 may include various types of volatile or non-volatile storage media. For example, the memory may include read-only memory (ROM) 831 and a random-access memory (RAM) 832. In an embodiment, the memory 830 may be located inside or outside the processor 810, and the memory 830 may be connected to the processor 810 through various known ways.

In some embodiments, at least some configurations or functions of an apparatus and method according to an embodiment may be implemented as a program or software executable by the computing device 800, and the program or software may be stored in a computer-readable medium.

In some embodiments, at least some configurations or functions of an apparatus and method according to an embodiment may be implemented by using hardware or circuitry of the computing device 800, or may also be implemented as separate hardware or circuitry that may be electrically connected to the computing device 800.

While this disclosure has been described in connection with what is presently considered to be practical embodiments, it is to be understood that the disclosure is not necessarily limited to the disclosed embodiments, but, on the contrary, is intended to cover various modifications and equivalent arrangements included within the spirit and scope of the appended claims.

What is claimed is:

1. An apparatus comprising:

one or more processors; and one or more memory devices storing computer-readable instructions that, when executed by the one or more processors, enable the one or more processors to:

receive a thermal image from a thermal imaging camera;

detect a human being from the received thermal image by using an artificial intelligence model, wherein a position of the detected human being is estimated in pixel units, including to generate a temperature map from the thermal image through an equation of $$T(x,y)=\left(\frac{I(x,y)T_p^4}{I_p}\right)^{\frac{1}{4}}-273.15$$

wherein Tp is 310.35K, Ip is an average pixel value of a worker area in the thermal image, I(x, y) is a pixel value at a pixel position (x, y) in the thermal image, and T(x, y) is a temperature value calculated at a pixel position (x, y);

detect a hazard based on whether the detected human being has entered a preset hazardous area in the thermal image; and based on the hazard being detected, send a hazard notification and stop operation of a work machine in the hazardous area.

2. The apparatus of claim 1, wherein the instructions further enable the one or more processors to receive a color image corresponding to the thermal image.

3. The apparatus of claim 2, wherein the instructions further enable the one or more processors to:

extract multi-scale features from the color image by using a backbone;

extract enhanced single-level features based on the multi-scale features through an encoder; and generate a mask feature in a mask branch, and generate an instance feature in an instance branch based on an input feature through a decoder by using the enhanced single-level feature as the input feature.

4. The apparatus of claim 3, wherein the instructions further enable the one or more processors to identify an area having a temperature range of top 40% among temperature ranges in the temperature map and determine the identified area as the worker area, and generate a temperature mask by selecting the worker area.

5. The apparatus of claim 4, wherein the instructions further enable the one or more processors to generate a mask kernel by inputting a result value according to an element-wise multiplication of the temperature mask and the input feature of the instance branch to an instance activation map.

6. The apparatus of claim 5, wherein the instructions further enable the one or more processors to generate a segmentation mask configured to indicate the human being through an element-wise multiplication of the mask kernel and the mask feature.

7. The apparatus of claim 6, wherein the instructions further enable the one or more processors to:

determine that the hazard is detected based on a human being mask indicating the human being among the segmentation mask has entered the hazardous area, and determine that the human being mask has entered the hazardous area based on at least 10% of an area of the human being mask overlapping the hazardous area.

8. The apparatus of claim 3, wherein the instructions further enable the one or more processors to, based on the thermal image including a temperature value in pixel units, identify an area in the thermal image whose average temperature is 28° C. to 38° C. and generate a temperature mask.

9. The apparatus of claim 8, wherein the instructions further enable the one or more processors to:

generate a mask kernel by inputting a result value according to an element-wise multiplication of the temperature mask and the input feature of the instance branch to an instance activation map, and generate a segmentation mask configured to indicate the human being through an element-wise multiplication of the mask kernel and the mask feature.

10. The apparatus of claim 1, wherein the instructions further enable the one or more processors to set the hazardous area in the thermal image through a deep learning-based hazardous area recommendation model.

11. A method for detecting a human being using thermal imaging, the method comprising:

receiving a thermal image from a thermal imaging camera;

detecting the human being from the received thermal image by using an artificial intelligence model;

estimating in pixel units the detected human being in the thermal image;

detecting a hazard based on whether the human being has entered a preset hazardous area in the thermal image;

sending a hazard notification and stopping operation of a work machine in the hazardous area based on the hazard being detected, wherein the detecting the human being further comprises:

in case the thermal image includes a temperature in pixel units, identifying an area whose average temperature is 28° C. to 38° C. and selecting the identified area as a worker area, and in case the thermal image does not include the temperature in pixel units, generating a temperature map through an equation of $$T(x,y)=\left(\frac{I(x,y)T_p^4}{I_p}\right)^{\frac{1}{4}}-273.15,$$

identifying an area having a temperature range of top 40% among temperature ranges in the temperature map, and selecting the identified area as the worker area, wherein Tp is 310.35K, Ip is an average pixel value of the worker area in the thermal image, (x, y) is a pixel value at a pixel position (x, y) in the thermal image, and T(x, y) is a temperature value calculated at a pixel position (x, y); and generating a temperature mask in the area selected as the worker area.

12. The method of claim 11, wherein the detecting the human being comprises:

extracting multi-scale features from a color image corresponding to the thermal image by using a backbone; and extracting enhanced single-level features based on the multi-scale features through an encoder.

13. The method of claim 12, wherein the detecting the human being further comprises generating a mask feature and an instance feature through a decoder by using the enhanced single-level feature as an input feature, wherein the mask feature is generated in a mask branch of the decoder, and wherein the instance feature is generated in an instance branch of the decoder based on the input feature.

14. The method of claim 13, wherein the detecting the human being further comprises matching a resolution of the temperature mask with a resolution of the input feature of the instance branch.

15. The method of claim 14, wherein the detecting the human being further comprises generating the instance feature including a mask kernel by inputting a result value according to an element-wise multiplication of the temperature mask and the input feature of the instance branch to an instance activation map.

16. The method of claim 15, wherein the detecting the human being further comprises generating a segmentation mask configured to indicate the human being worker through an element-wise multiplication of the mask kernel and the mask feature.

17. The method of claim 16, further comprising setting the hazardous area in the thermal image through a deep learning-based hazardous area recommendation model.

18. The method of claim 17, wherein the detecting the hazard comprises determining that a human being mask has entered the hazardous area based on at least 10% of an area occupied by the human being mask indicating the human being in the segmentation mask overlaps the hazardous area.

19. A method for detecting a human being using thermal imaging, the method comprising:

receiving a thermal image from a thermal imaging camera;

detecting the human being from the received thermal image by using an artificial intelligence model, wherein detecting the human being further comprises:

in case the thermal image includes a temperature in pixel units, identifying an area whose average temperature is 28° C. to 38° C. and selecting the identified area as a worker area, and in case the thermal image does not include the temperature in pixel units, generating a temperature map through an equation of $$T(x, y) = \left(\frac{I(x, y)T_p^4}{I_p}\right)^{\frac{1}{4}} - 273.15,$$

identifying an area having a temperature range of top 40% among temperature ranges in the temperature map, and selecting the identified area as the worker area, wherein Tp is 310.35K, Ip is an average pixel value of the worker area in the thermal image, (x, y) is a pixel value at a pixel position (x, y) in the thermal image, and T(x, y) is a temperature value calculated at a pixel position (x, y);

generating a temperature mask in the area selected as the worker area;

estimating in pixel units the detected human being in the thermal image;

detecting a hazard based on whether the human being has entered a preset hazardous area in the thermal image; and sending a hazard notification based on the hazard being detected.

20. The method of claim 19, further comprising stopping operation of a work machine in the hazardous area based on the hazard being detected.

* * * * *